(12) United States Patent
Wu et al.

(10) Patent No.: US 10,484,698 B2
(45) Date of Patent: *Nov. 19, 2019

(54) DETECTING MARKERS IN AN ENCODED VIDEO SIGNAL

(71) Applicant: Microsoft Technology Licensing, LLC, Redmond, WA (US)

(72) Inventors: Yongjun Wu, Bellevue, WA (US); Chih-Lung Lin, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 113 days.

This patent is subject to a terminal disclaimer.

(21) Appl. No.: 15/853,191

(22) Filed: Dec. 22, 2017

(65) Prior Publication Data

US 2018/0139463 A1    May 17, 2018

Related U.S. Application Data

(63) Continuation of application No. 14/590,605, filed on Jan. 6, 2015, now Pat. No. 9,854,261.

(51) Int. Cl.
*H04N 19/436*    (2014.01)
*H04N 19/44*    (2014.01)

(52) U.S. Cl.
CPC .......... *H04N 19/436* (2014.11); *H04N 19/44* (2014.11)

(58) Field of Classification Search
CPC .............................. H04N 19/436; H04N 19/44
See application file for complete search history.

(56) References Cited

U.S. PATENT DOCUMENTS 4,841,438 A    6/1989    Yoshida et al.
5,073,864 A    12/1991    Methvin et al.
(Continued)

FOREIGN PATENT DOCUMENTS

CN    101455087 A    6/2009
CN    101981934 A    2/2011
(Continued)

OTHER PUBLICATIONS

"International Preliminary Report on Patentability", Application No. PCT/US2016/012098, dated Mar. 3, 2017, 7 pages.
(Continued)

*Primary Examiner* — Gims S Philippe
*Assistant Examiner* — Stefan Gadomski
(74) *Attorney, Agent, or Firm* — Klarquist Sparkman, LLP

(57) ABSTRACT

A video decoding method is implemented by a computer having multiple parallel processing units. A stream of data elements is received, some of which encode video content. The stream comprises marker sequences, each marker sequence comprising a marker which does not encode video content. A known pattern of data elements occurs in each marker sequence. A respective part of the stream is supplied to each parallel processing unit. Each parallel processing unit processes the respective part of the stream, whereby multiple parts of the stream are processed in parallel, to detect whether any of the multiple parts matches the known pattern of data elements, thereby identifying the markers. The encoded video content is separated from the identified markers. The separated video content is decoded, and the decoded video content outputted on a display.

20 Claims, 8 Drawing Sheets

(56) References Cited

U.S. PATENT DOCUMENTS

| | | |
|---|---|---|
| 5,359,605 A | 10/1994 | Urbansky et al. |
| 5,522,083 A | 5/1996 | Gove et al. |
| 5,532,744 A | 7/1996 | Akiwumi-Assani et al. |
| 5,764,801 A | 6/1998 | Munemasa et al. |
| 5,903,769 A | 5/1999 | Arya |
| 6,094,443 A | 7/2000 | Dwork |
| 6,373,898 B1 | 4/2002 | Langer et al. |
| 6,453,408 B1 | 9/2002 | Stuart Fiske et al. |
| 6,470,034 B1 | 10/2002 | Tan |
| 6,847,365 B1 | 1/2005 | Miller et al. |
| 6,948,050 B1 | 9/2005 | Gove et al. |
| 6,956,600 B1* | 10/2005 | Gaylord ............... H04N 7/15 348/14.08 |
| 7,248,740 B2* | 7/2007 | Sullivan ............. H04J 3/0605 382/232 |
| 7,373,488 B2 | 5/2008 | Paver et al. |
| 7,436,328 B2 | 10/2008 | Zhou |
| 7,974,307 B2 | 7/2011 | Meric |
| 8,265,144 B2 | 9/2012 | Christoffersen et al. |
| 8,320,744 B2 | 11/2012 | Kashima et al. |
| 8,565,299 B2 | 10/2013 | Tseng et al. |
| 8,749,409 B2 | 6/2014 | Xu |
| 9,854,261 B2 | 12/2017 | Wu et al. |
| 2004/0034760 A1 | 2/2004 | Paver et al. |
| 2004/0095998 A1 | 5/2004 | Luo et al. |
| 2004/0123079 A1 | 6/2004 | Bosshart |
| 2006/0013318 A1* | 1/2006 | Webb ................. H04N 19/70 375/240.25 |
| 2006/0015702 A1 | 1/2006 | Khan et al. |
| 2006/0269147 A1* | 11/2006 | Shen ................... H04N 19/70 382/232 |
| 2006/0274940 A1 | 12/2006 | Ozaki et al. |
| 2007/0200923 A1* | 8/2007 | Eleftheriadis ......... H04N 7/152 348/14.08 |
| 2008/0075173 A1 | 3/2008 | Jain et al. |
| 2008/0209180 A1* | 8/2008 | Lee .................... H04N 19/169 712/220 |
| 2008/0310555 A1 | 12/2008 | Kee |
| 2008/0317134 A1* | 12/2008 | Zhou ................... H04N 7/15 375/240.25 |
| 2009/0228601 A1* | 9/2009 | Tseng ................. H04N 19/70 709/231 |
| 2009/0257667 A1* | 10/2009 | Naito ................. H04N 19/176 382/233 |
| 2009/0285236 A1 | 11/2009 | Morita |
| 2010/0008415 A1 | 1/2010 | Kajita |
| 2010/0166052 A1 | 7/2010 | Okuda et al. |
| 2010/0166081 A1 | 7/2010 | Onoye et al. |
| 2010/0254620 A1* | 10/2010 | Iwahashi ............. H04N 19/70 382/233 |
| 2010/0322317 A1* | 12/2010 | Yoshimatsu ......... H04N 19/70 375/240.24 |
| 2011/0150088 A1* | 6/2011 | de Rivaz ............. H04N 19/50 375/240.13 |
| 2011/0274178 A1 | 11/2011 | Onno et al. |
| 2011/0280314 A1* | 11/2011 | Sankaran ............ G06F 9/3877 375/240.25 |
| 2012/0155551 A1* | 6/2012 | Sim ..................... G06F 9/30 375/240.25 |
| 2012/0163455 A1 | 6/2012 | Zheng et al. |
| 2012/0163469 A1 | 6/2012 | Kim et al. |
| 2012/0183079 A1* | 7/2012 | Yoshimatsu ......... H04N 19/44 375/240.25 |
| 2012/0275516 A1 | 11/2012 | Tanaka et al. |
| 2013/0114735 A1 | 5/2013 | Wang |
| 2013/0114736 A1 | 5/2013 | Wang et al. |
| 2013/0117270 A1* | 5/2013 | Sullivan ............. G06F 16/285 707/740 |
| 2013/0215978 A1* | 8/2013 | Wu ..................... H04N 19/46 375/240.26 |
| 2014/0003489 A1 | 1/2014 | Hannuksela |
| 2014/0025717 A1 | 1/2014 | Lyalin |
| 2014/0086326 A1* | 3/2014 | Dziecielewski ....... H04N 19/70 375/240.16 |
| 2014/0092987 A1* | 4/2014 | Singer ................. H04N 19/70 375/240.25 |
| 2014/0198857 A1 | 7/2014 | Deshpande |
| 2014/0267578 A1 | 9/2014 | Rowe et al. |
| 2015/0163506 A1* | 6/2015 | Chon ................. H04N 19/187 375/240.16 |
| 2015/0222917 A1 | 8/2015 | Wu et al. |
| 2016/0019817 A1 | 1/2016 | Deokar et al. |

FOREIGN PATENT DOCUMENTS

| | | |
|---|---|---|
| CN | 102547280 A | 7/2012 |
| CN | 102577385 A | 7/2012 |
| JP | 2007295423 A | 11/2007 |

OTHER PUBLICATIONS

"International Search Report and Written Opinion", Application No. PCT/US2016/012098, dated Apr. 5, 2016, 13 pages.

"Non-Final Office Action", U.S. Appl. No. 14/590,605, dated Feb. 16, 2017, 25 pages.

"Notice of Allowance", U.S. Appl. No. 14/590,605, dated Aug. 23, 2017, 10 pages.

"Second Written Opinion", Application No. PCT/US2016/012098, dated Nov. 25, 2016, 8 pages.

Ostermann,"Video coding with H.264/AVC: Tools, Performance, and Complexity", In IEEE Circuits and Systems Magazine, vol. 4, Issue 1, Aug. 2, 2004, 22 pages.

Weigand,"Overview of the H.264/AVC Video Coding Standard", Transactions on Circuits and Systems for Video Technology, vol. 13, No. 7, Jul. 2003, pp. 560-576.

* cited by examiner

DETECTING MARKERS IN AN ENCODED VIDEO SIGNAL

RELATED APPLICATIONS

This application is a continuation of and claims priority to U.S. patent application Ser. No. 14/590,605 entitled "Detecting Markers in an Encoded Video Signal", and filed Jan. 6, 2015, the disclosure of which is incorporated by reference herein in its entirety.

BACKGROUND

In modern communications systems a video signal may be sent from one device to another over a medium such as a wired and/or wireless network, often a packet-based network such as the Internet. Typically video content, i.e. data which represents the values (e.g. chrominance, luminance) of samples in slices of the video, is encoded by an encoder at the transmitting device in order to compress the video content for transmission over the network. Herein, "slice" means a frame of the video or region of a frame of the video i.e. a frame is comprised of one or more slices. The encoding for a given slice may comprise intra frame encoding whereby (macro) blocks are encoded relative to other blocks in the same slice. In this case a target block is encoded in terms of a difference (the residual) between that block and a neighbouring block. Alternatively the encoding for some frames or slices may comprise inter frame encoding whereby blocks in the target slice are encoded relative to corresponding portions in a preceding frame, typically based on motion prediction. In this case a target block is encoded in terms of a motion vector identifying an offset between the block and the corresponding portion from which it is to be predicted, and a difference (the residual) between the block and the corresponding portion from which it is predicted. The residual data may then be subject to transformation into frequency coefficients, which are then subject to quantization whereby ranges of frequency coefficients are compressed to single values. Finally, lossless encoding such as entropy encoding may be applied to the quantized coefficients. A corresponding decoder at the receiving device decodes the slices of the received video signal based on the appropriate type of prediction, in order to decompress them for output on a display.

Once the video content has been encoded, the encoded video content is structured for transmission via the network. The coded video content may be divided into packets, each containing an encoded slice. For example, the H.264 and HEVC (High Efficiency Video Coding) standards define a Video Coding Layer (VCL) at which the (e.g. inter/intra) encoding takes place to generate the coded video content (VCL data), and a Network Abstraction Layer (NAL) at which the VCL data is encapsulated in packets—called NAL units (NALUs)—for transmission. The VCL data represents values of samples in the video slices. Non-VCL data, which generally includes encoding parameters that are applicable to a relatively large number of frames or slices, is also encapsulated in NALUs at the NAL. Each NALU has a payload which contains either VCL or non-VCL data (not both) in byte (8 bit)-format, and a two-byte header which among other things identifies the type of the NALU.

The NAL representation is intended to be compatible with a variety of network transport layer formats, as well as with different types of computer-readable storage media. Some packet-orientated transport layer protocols provide a mechanism by which the VCL/non-VCL data can be divided into packets; however, other stream-orientated transport layer protocols do not. With a view to the latter, an H.264 byte stream format is defined, whereby the raw NAL data—comprising encoded VCL data, non-VCL data and NALU header data—may be represented and received at the transport layer of the network for decoding, or from local computer storage, as a stream of data elements. A "stream of data elements" (stream) means a sequence of data elements which is received, and which thus becomes available for decoding, over time so that decoding and outputting of video content in earlier parts of the stream can commence before later parts of the stream have been received. For the H.264 byte stream format, the stream is a byte stream i.e. the data elements are bytes. A similar format is defined in the HEVC standard, the successor to H.264. Some similar format is also adopted in SMPTE VC-1 standard.

Dividing markers, called start code prefixes, are included in the byte stream to mark the boundaries between NALUs so that each NALU header is preceded by a start code prefix marking the start of that NALU. 3 and 4 byte start code prefixes are defined, which are 0x 00 00 01 and 0x 00 00 00 01. Note "0x ij kl . . . " means each of "ij", "kl", . . . is a hexadecimal representation of a 1-byte value e.g. 0x 00 is equivalent to 0000 0000 in binary, 0x 0A to 0000 1010, 0x FF to 1111 1111 etc. At the receiving terminal, the sequence is parsed to identify the start code prefixes and, in turn, the NALUs. The payload data is separated out, and any encoded slices are supplied to the decoder, which decodes the video slices by effectively inverting the various encoding processes. Certain byte patterns—specifically 0x 00 00 0y where y=0, 1 or 2—are illegal within an NALU payload i.e. the device decoding the byte sequence operates on the assumption that these sequences will not occur within a NALU payload so, if they do, this is liable to cause an error in or failure of the separation process. For example, the sequence 0x 00 00 01 is illegal in a payload because that sequence is reserved for the start code prefixes; if it were to occur in an intended payload, the decoding device would mistake it for a start code prefix marking the start of the next NALU and treat it as such. For this reason, at the same time as inserting the start code prefixes the encoding device inserts emulation prevention markers as follows: whenever the byte pattern 0x 00 00 0z, where z=0, 1, 2 or 3, occurs in the NALU payload data, a 1-byte emulation prevention marker, which is an emulation prevention byte, 0x 03 is inserted so that the pattern becomes 0x 00 00 03 0z; at the decoding device, at the same time as parsing the sequence to identify the start code prefixes, occurrences of the byte pattern 00 00 03 0z are identified, and the emulation prevention byte 0x 03 is removed before the relevant part of the stream is decoded; z=3 is included to ensure that 0x 03 bytes which occur 'naturally' in the NALU payloads are not mistaken for emulation prevention bytes and mistakenly removed before decoding.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A video decoding method is implemented by a computer having multiple parallel processing units. A stream of data elements is received, some of which encode video content. The stream comprises marker sequences, each marker sequence comprising a marker which does not encode video content. A known pattern of data elements occurs in each marker sequence. A respective part of the stream is supplied to each parallel processing unit. Each parallel processing unit processes the respective part of the stream, whereby multiple parts of the stream are processed in parallel, to detect whether any of the multiple parts matches the known pattern of data elements, thereby identifying the markers. The encoded video content is separated from the identified markers. The separated video content is decoded, and the decoded video content outputted on a display.

BRIEF DESCRIPTION OF FIGURES

To aid understanding of the subject matter and to show how the same may be carried into effect, reference will now be made to the following figures in which.

DETAILED DESCRIPTION

Video playback is computationally intensive. Byte pattern scan is a necessary step in video decoding for video playback when the byte stream format is used. For example, to decode videos in H.264 or HEVC coding format, the emulation prevention byte pattern, and the three byte start code prefix (start_codeprefix_one_3 bytes) byte pattern etc. need to be found in a the byte stream.

It is a computational intensive task to scan and check through each byte. Previous methods use straightforward scan, byte-by-byte, for emulation prevention byte pattern identification, start_codeprefix_one_3 bytes byte pattern identification etc., which is computationally inefficient. That is, previous solutions use straight-line code executing on the main processor to perform marker identification of markers in the byte stream.

Presented below is a new algorithm of optimized byte pattern scan in video data with various platform SIMD (Single Instruction Multiple Data) capabilities, such as ARM NEON and x86/amd64 SSE. It improves significantly the performance of byte pattern scan in the byte stream. The new algorithm is applied to the byte sequence adaptively according to the probability of byte pattern occurrence with analysis on NALUs in the H.264 or HEVC video coding standards. In this manner, the new algorithm takes advantage of platform SIMD capabilities to optimize the byte pattern search in video data, such as the ARM NEON and x86/amd64 SSE platforms (among others).

The inventors have appreciated that parallel processing capabilities, which up to now have only been exploited to parallelize certain aspects of the decoding of the actual video content after it has already been separated from the markers, can also be exploited at the earlier content-separation stage itself to increase the efficiency of the separation process prior to decoding. As explained below, the inventors have recognised certain properties of the byte stream which make this feasible.

Figure 1:
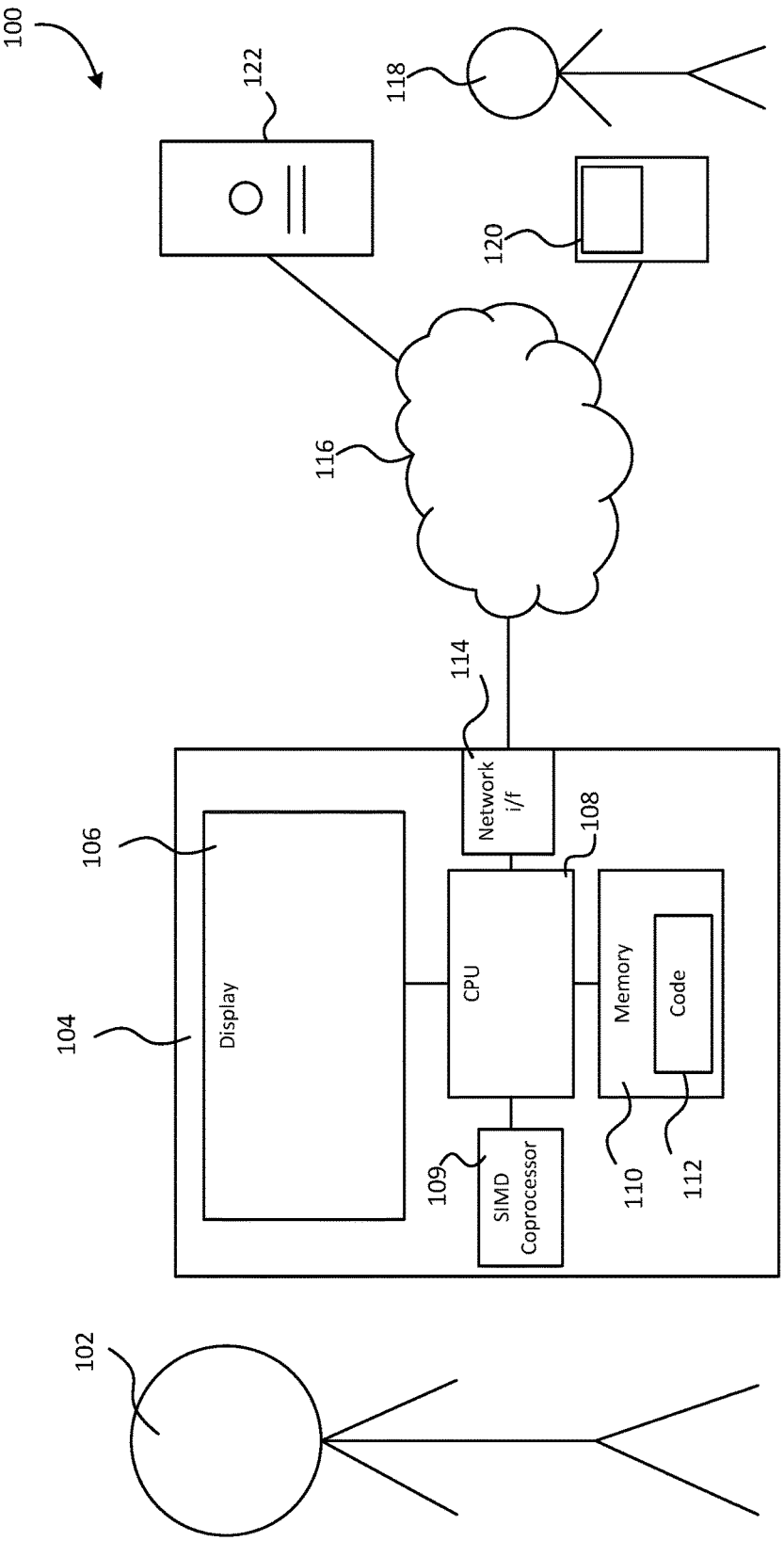
FIG. 1 shows a schematic block diagram of a user device connected to a network.

FIG. 1 shows a system 100, which comprises a network 116, a user device 104 of a user 102, another user device 120 of another user 118, and a media server 122. The user devices 104, 120 and the server 122 are connected to the network 116. The network 116 has network layers, including a transport layer which provides end-to-end communication between different network endpoints such as the user devices 104, 120 and the server 122.

The user device 104 comprises a main processor, which is a CPU (Central Processing Unit) 108, to which are connected a network interface 144—via which the user device 114 is connected to the network 116—a computer readable storage medium (memory) 110 which holds software i.e. executable code 112, a coprocessor 109, and a display 104. The user device 104 is a computer which can take a number of forms e.g. that of a desktop or laptop computer, mobile phone (e.g. smartphone), tablet computing device, wearable computing device, television (e.g. smart TV), set-top box, gaming console etc.

The code 112 implements various functions when run on the main processor 112. For example, the code 112 might comprise a commination client (e.g. a communication client application, plugin to another application such as a Web browser etc.) which enables real-time video communication events—such as video calls, screen sharing, whiteboard sessions, or any other communication event having a video modality—to be established between the user device 104 and the other user device 120 via the network 116 so that the user 102 and the other user 118 can communicate with one another via the network 116. The communication event may for instance be established via a server(s), or via a peer-to-peer connection. Alternatively, or in addition, the code may comprise a video player (e.g. application, plug-in etc.), which enables the user device 104 to stream video content from the media server 112, for instance video-on-demand content.

The coprocessor is a SIMD processor which comprises N parallel processing units. The main processor 108 can control the coprocessor to perform parallel processing operations by loading SIMD instruction(s) from the memory 110 to an instruction register accessible to the coprocessor 109. The results of the parallel processing operations are communicated back to the coprocessor 108 by the coprocessor loading the results to a register accessible to the main processor 108.

The main processor 108 can control the display 106 to output information to the user 102 in visual form, including to output decoded video (e.g. of a video communication event, or streamed from the media server 112). The display 104 may comprise a touchscreen so that it functions as both an input and an output device, and may or may not be integrated in the user device 104 e.g. it may be part of a separate device, such as a headset, smartwatch etc., connectable to the user device 104 via suitable interface.

The software 112 provides user interface(s) for receiving information from and outputting information to the user 102, including decoded video content. The user interface may comprise, for example, a Graphical User Interface (GUI) which outputs information via the display 24 and/or a Natural User Interface (NUI) which enables the user to interact with a device in a natural manner, free from artificial constraints imposed by certain input devices such as mice, keyboards, remote controls, and the like. Examples of NUI methods include those utilizing touch sensitive displays, voice and speech recognition, intention and goal understanding, motion gesture detection using depth cameras (such as stereoscopic or time-of-flight camera systems, infrared camera systems, RGB camera systems and combinations of these), motion gesture detection using accelerometers/gyroscopes, facial recognition, 3D displays, head, eye, and gaze tracking, immersive augmented reality and virtual reality systems etc.

For example, a client user interface of a communication client application, plugin etc. may output decoded video of a call during a video communication event.

Figure 2:
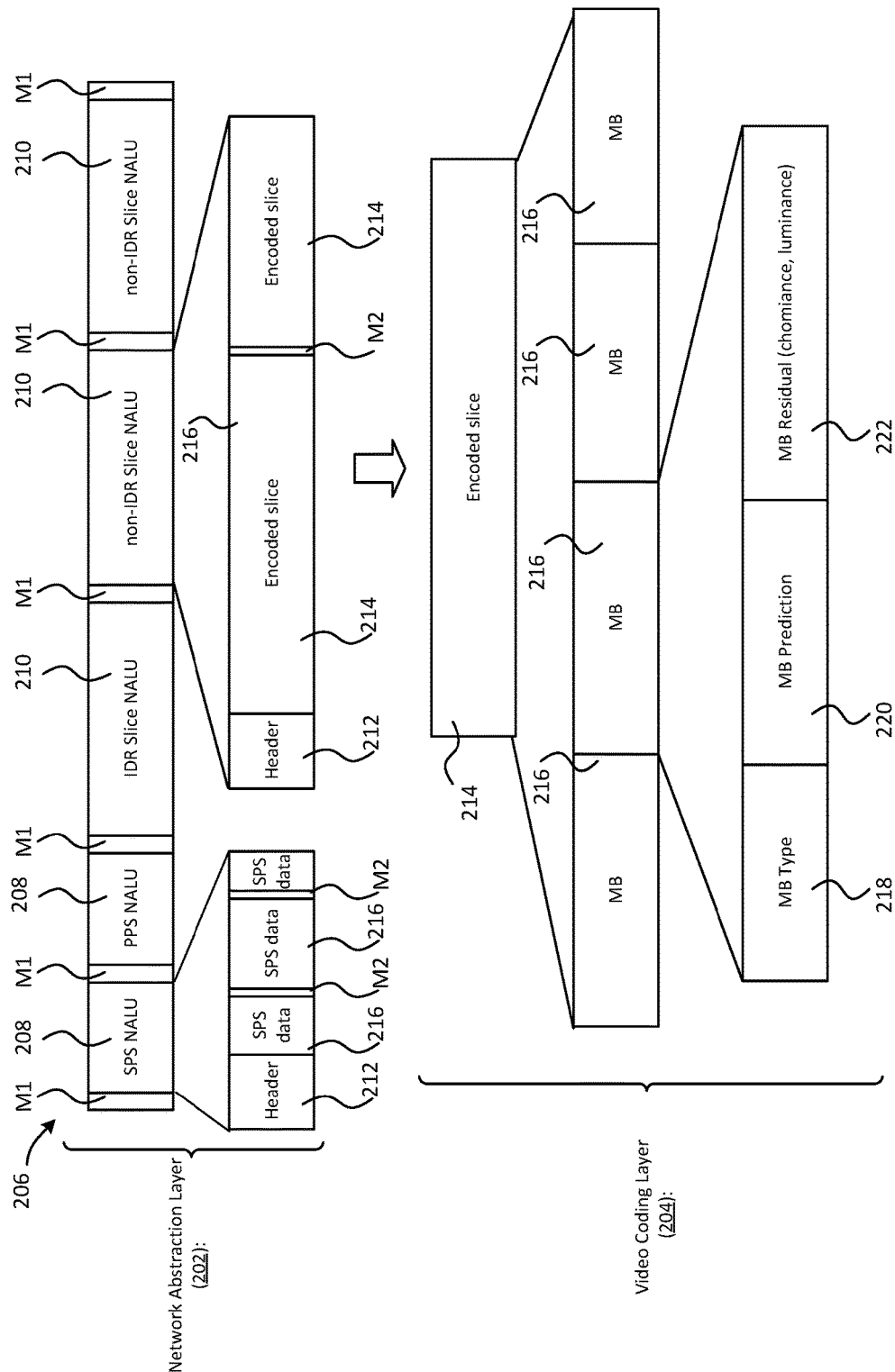
FIG. 2 schematically illustrates representations of video data at a Network Abstraction Layer and a Video Coding Layer.

FIG. 2 illustrates a part of an NALU byte stream in accordance with the H.264 byte stream format. In this example, the byte stream is received by the user device via the network 116 at the transport layer of the network 116 from another network node, at which a video has been encoded by an encoder of the network node, and the encoded video formatted to create the NALU byte stream. The other network node may for instance be the other user device 120 or the media server 122, and the video may for instance be of a video communication event or streamed as part of an on-demand video service.

The byte stream is divided into a mixture of non-VCL NALUs 208 and VCL NALUs 210 by dividing markers M1. The dividing markers M1 are 3 byte start code prefixes of the form 0x 00 00 01.

The VCL NALUs 210 have payloads, each comprising encoded video content, specifically an encoded slice 214 of the video; the non-VLC NALUs have payloads, which comprise additional information 215 associated with the encoded slices, such as parameter sets which convey information that can typically apply to a large number of VCL NALUs e.g. the resolution and frame rate of the video content.

There are two types of parameter sets: sequence parameter sets, which apply to a series of consecutive coded video frames (coded video sequence); and picture parameter sets, which apply to the decoding of one or more individual frames within a coded video sequence.

An access unit is defined as a set of NALUs which encode one frame. An access unit comprises one or more VCL NALUs, one for each of the one or more slices of the frame, and can also include non-VCL NALU(s). Access unit delimiters may be included in the stream 206, which are also non-VCL NALUs, to divide the NALUs into access units.

Non-VCL NALUs can also contain supplemental enhancement information, which can enhance the usability of the decoded video content but is not required for successful decoding of the video content, e.g. identifying a limited sub-region of the video (e.g. a "pan-scan rectangle") to be displayed on small screen devices, or an indication that the video should be flipped or rotated.

Parameter sets and supplemental enhancement information are examples of control data.

At the Video Coding Layer, an encoded slice comprises sets of encoded macroblocks 216, one set for each macroblock in the slice, which may be inter or intra encoded. Each set of macroblock data 216 comprises an identifier of the type 218 of the macroblock i.e. inter or intra, an identifier of a reference macroblock relative to which the macroblock is encoded (e.g. which may comprise a motion vector), and the residual 216 of the macroblock, which represents the actual values of the samples of the macroblock relative to the reference. Each set of macroblock data 216 may also comprise other parameters, such as a quantization parameter of the quantization applied to the macroblock by the encoder.

One type of VCL NALU is an IDR (Instantaneous Decoder Refresh) NALU, which contains an encoded IDR slice. An IDR slice contains only intra-encoded macroblocks and the presence of an IDR slice indicates that future slices encoded in the stream will not use any slices earlier than the IDR slice as a reference i.e. so that the decoder is free to discard any reference frames it is currently holding as they will no longer be used as references. Another type of VCL NALU is a non-IDR NALU, which contains a non-IDR slice. A non-IDR slice can contain inter-encoded macroblocks and/or intra-encoded macroblocks, and does not provide any such indication.

A given NALU payload, both of a VCL and non-VCL NALU, may also comprise one or more emulation prevention markers M2, which are emulation prevention bytes of the form 0x 03. These are inserted in the byte stream by the encoder for reasons discussed above.

The NALUs 208, 210 have headers 114, which immediately follow the start code prefixes M1 and are two bytes in length, and which among other things indicate the type of data contained in the NALU payload, with each type categorized as either VCL or non-VCL. It can thus be determined from the header whether NALU is VCL (contains encoded video content) or non-VCL (containing control data).

Figure 3:
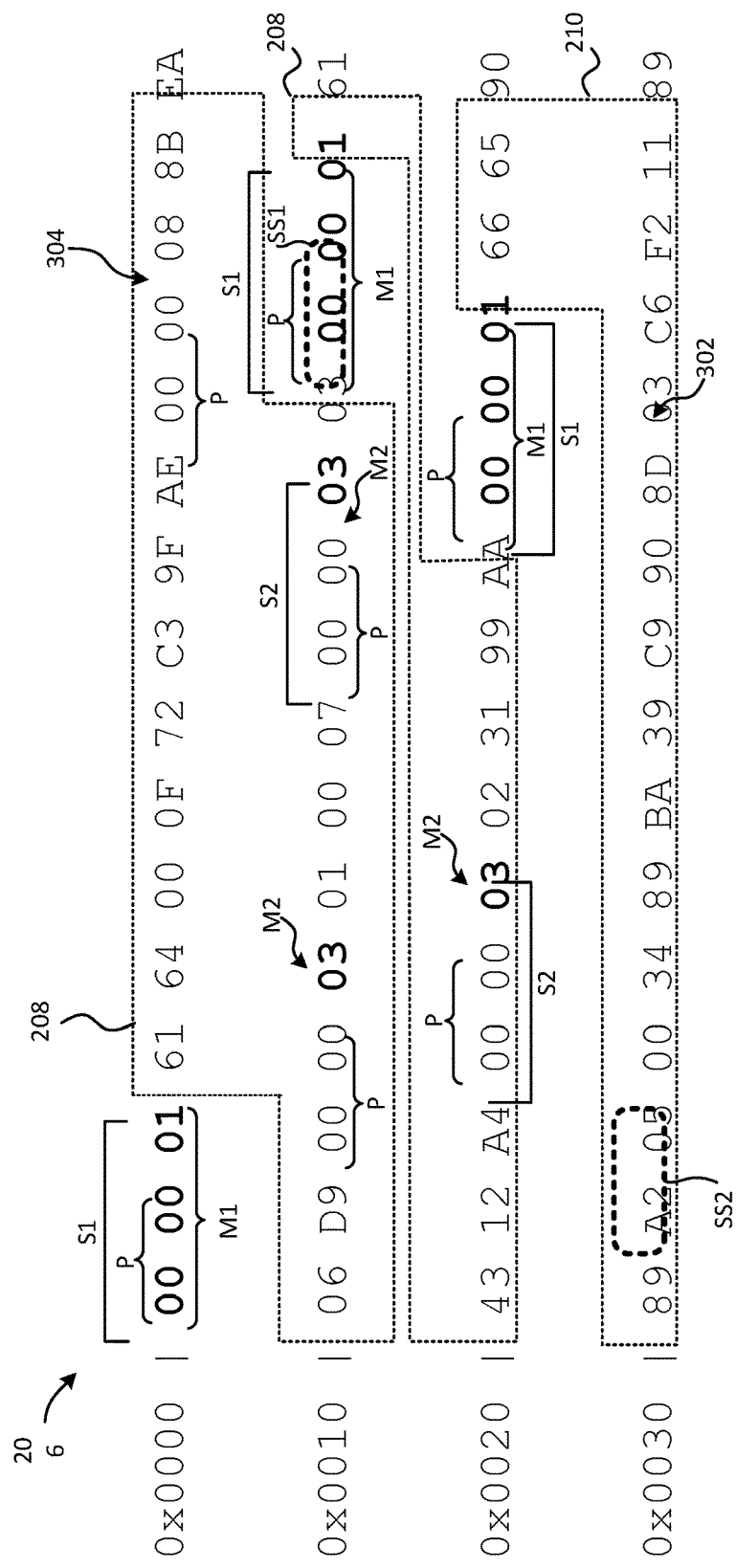
FIG. 3 shows a part of a hexadecimal representation of an exemplary encoded video byte stream.

FIG. 3 shows a hexadecimal representation of a part of the byte stream 206. As shown, the stream 206 is formed of a sequence of bytes. The first three bytes of the stream 206 shown in FIG. 3 are 0x 00 00 01 i.e. a first type marker sequence S1 which constitutes a start code prefix M1—marking the start of a first NALU, which is a non-VCL NALU 208 (e.g. a sequence parameter set NALU) in this example. The first NALU is followed by a second NALU—bytes 29 to 31 in the stream, the start of which is also marked by a start code prefix M1 and which is also another non-VCL NALU (e.g. a picture parameter set NALU) in this example. The second NALU is followed by a third NALU, the start of which is marked by another start code prefix M1—bytes 43-45. The third NALU is a VCL NALU 210 in this example (only part of the third NALU is shown). The first two bytes of each NALU in FIG. 3 (0x 61 64 for the first etc.) constitute that NALU's header; the remaining bits (up to the next start code prefix M1—not shown) constitute its payload.

Emulation preventions bytes M2 are also present in the payloads, having been inserted by the encoder according to the rule 0x 00 00 0z→0x 00 00 03 0z for z=0, 1, 2 or 3 because it is illegal for the pattern 0x 00 00 0z to occur within an NALU payload (see above).

Each start code prefix M1 commences with a known pattern of bytes P, which is 0x 00 00; each emulation prevention byte M2 is preceded by the same known pattern P i.e. 0x 00 00. Thus, each start code prefix M1 and each emulation prevention byte M2 is indicated by a respective occurrence of the known pattern P i.e. an occurrence of the bytes 0x 00 00 in the sequence.

Of course, not every byte 0x 03 is an emulation prevention marker—e.g. it can be seen that the 0x 03 byte labelled 302 is not an emulation prevention byte because it is not preceded by the known pattern P i.e. 0x 00 00; conversely, not every occurrence of the known pattern P i.e. 0x 00 00 indicates the presence of a start code prefix or emulation prevention byte—e.g. it can be seen that the 0x 08 byte labelled 304 is proceeded by P i.e. 0x 00 00, but is neither an emulation prevention byte nor part of a start code prefix. In other words, both P i.e. 0x 00 00 and 0x 03 can occur naturally in the NALU payloads, but the rule according to which the emulation prevention bytes are inserted by the encoder ensures that whenever 0x 00 00 01 occurs in the byte stream 206 it is unambiguously a start code prefix, and whenever a second type of marker sequence S2 "0x 00 00 03" occurs in the byte stream 206 the "03" therein can be safely assumed to be an emulation prevention marker and removed accordingly.

Figure 4:
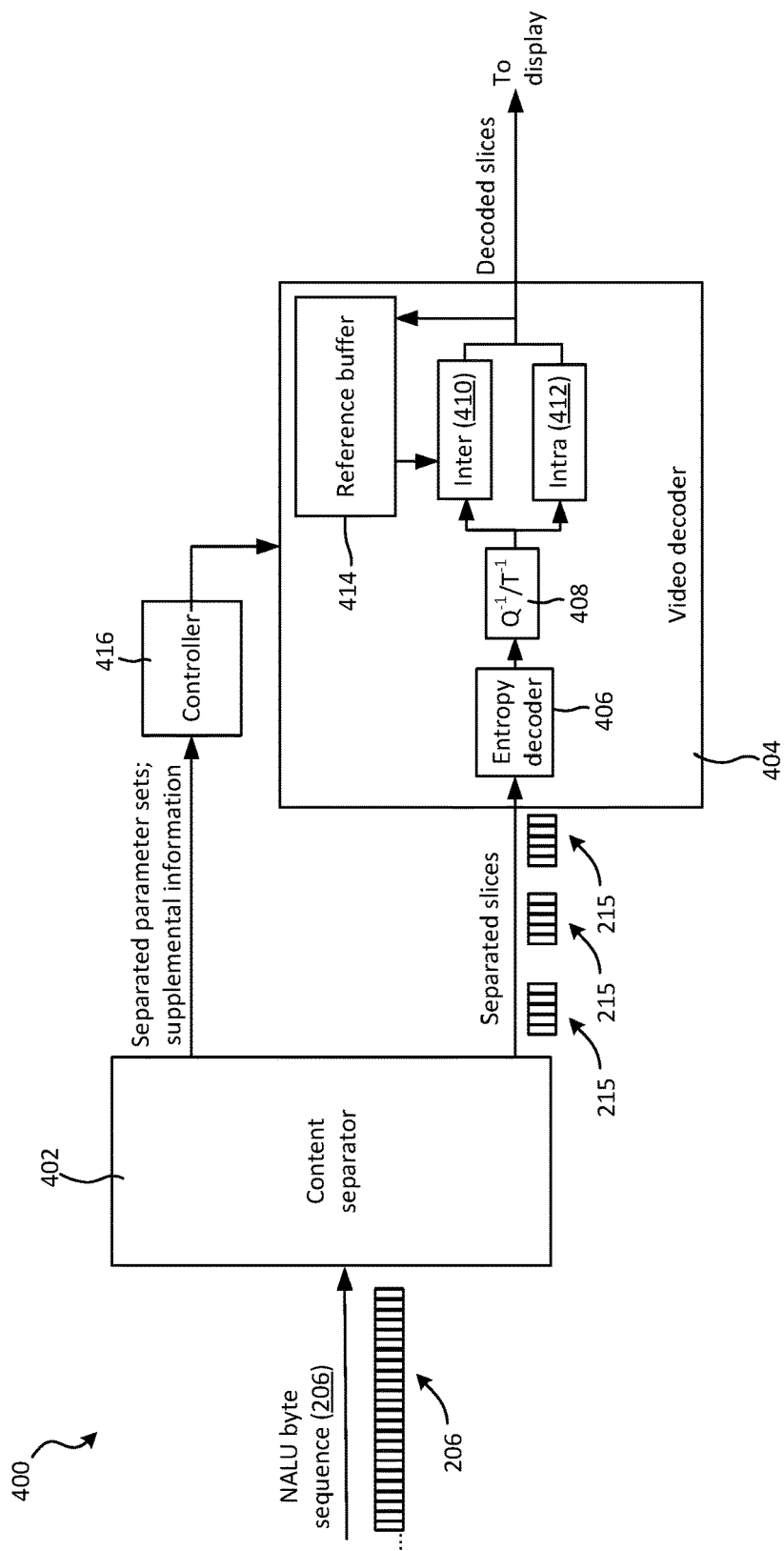
FIG. 4 shows a function block diagram of a video decoding system.

FIG. 4 shows a function block diagram of a video decoding system 400, which represents functionality implemented by running the code 112 on the user device 104. The system 400 comprises a content separator 402, the functionality of which is implemented by code executed on a combination of the main processor 108 and the coprocessor 109, a controller 416, and a video decoder 404.

The video decoder comprises an entropy decoder 406, an inverse quantization and transform module 408, an inter frame decoder 410, an intra frame decoder 412 and a reference slice buffer 414, all of which cooperate to implement a video decoding process.

The content separator 402 has an input configured to receive the NALU byte stream 206, which it processes to i) identify the start code prefixes M1 so as to identify the individual NALUs and ii) to identify and remove the emulation prevention bytes M2—this is in accordance with the new algorithm as the present disclosure, the details of which are described below.

The content separator 402 separates the encoded slices 214 from the rest of the stream 209, and has a first output by which it supplies the separated slices 214 to the decoder 404, which decodes the separated slices on a per-slice basis. The entropy decoder 406 has an input connected to the first output of the content separator 402, and is configured to reverse the entropy encoding applied at the encoder. The inverse quantization and transformation module 408 has an input connected to an output of the entropy decoder, by which it receives the entropy decoded slices, and applies inverse quantization to restore the macroblocks in each slice to their spatial domain representation. Finally, either interframe or intra-frame decoding is applied to the macroblocks in each slice as appropriate, and the decoded slices outputted from the decoder 404 to the display 106. Decoded slices are also selectively supplied to the slice reference buffer 414, in which they are held for use by the inter-frame decoder 410.

The content separator 402 also separates control data, such as parameter sets and any supplemental information from the rest of the stream 206. The content separator 402 has a second output connected to an input of the controller 416, by which is supplies the parameter sets and supplemental information to the controller 416. The controller 416 controls the video decoding process based on the parameter sets/supplemental information.

Responsive to the content separator 402 identifying that a VCL NALU in the stream 206 is an IDR NALU, the slice reference buffer 414 is emptied as the presence of the IDR NALU indicates that none of the currently held reference slices will be needed again.

Figure 5:
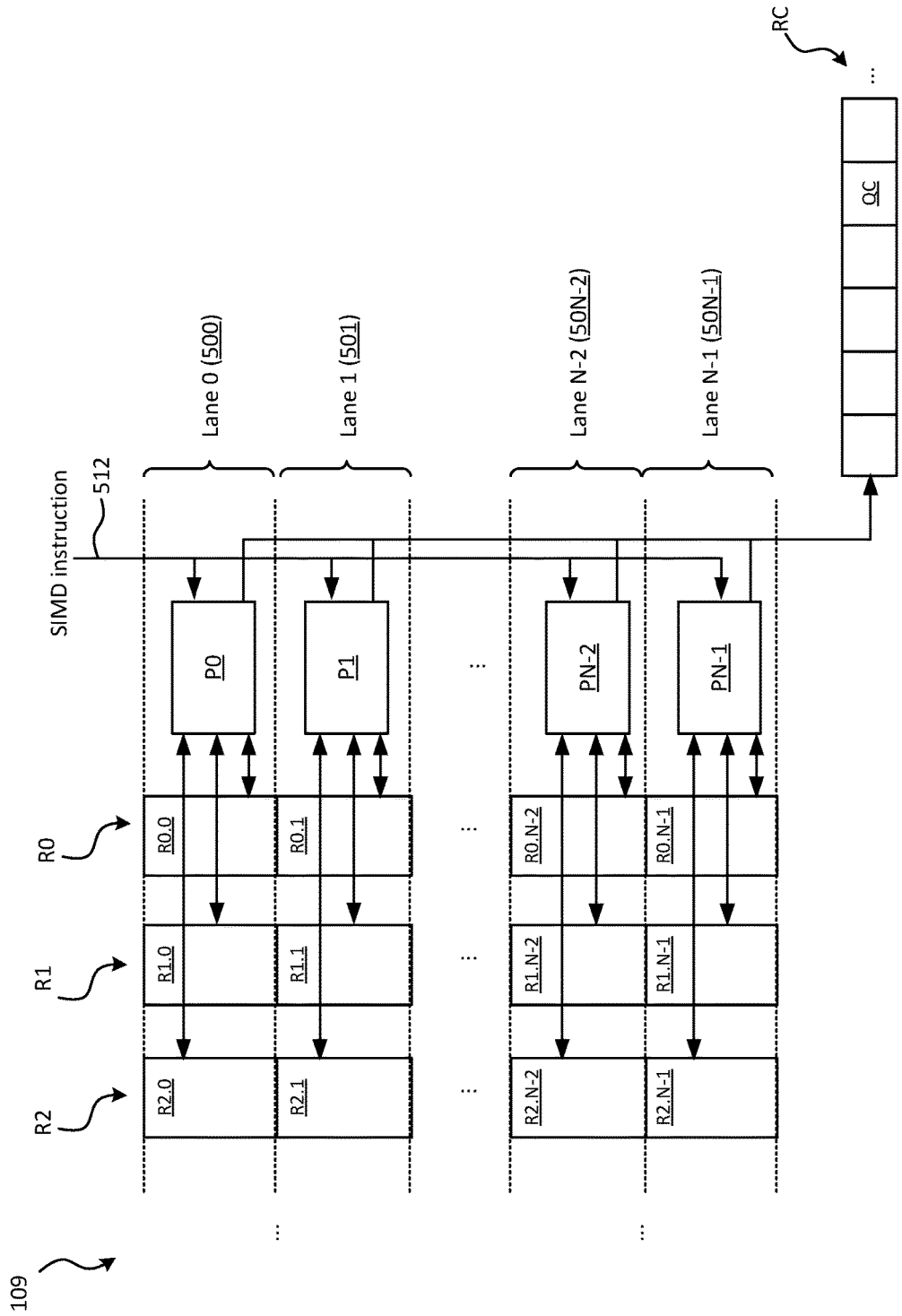
FIG. 5 schematically illustrates the architecture of a SIMD coprocessor.

FIG. 5 is a block diagram which illustrates the architecture of the SIMD coprocessor 109. The coprocessor comprises N (N>1) parallel processing units P0, P1, . . . , PN−2, PN−1, and a plurality of vector registers R0, R1, R2, . . . . Only four processing units and three vector registers are shown, but the coprocessor may comprise more or fewer processing units or vector registers. In practice, N will often be a power of 2 (N=2, 4, 8, 16, 32, 64, . . . ) but this is not required.

Each of the vector registers R0, R1, R1, . . . can hold N-bytes of data, and each processing unit P0, P1, . . . , PN−2, PN−1 has access to a respective 1-byte component of each vector register. A label Rx.n denotes the respective 1-byte component of the register Rx to which processing unit Pn has access. Each processing unit Pn and its respective vector register components R0.$n$, R1.$n$, R2.$n$ . . . (which correspond to one another) constitute a parallel processing lane 50$n$.

Responsive to a SIMD instruction 512 being issued, each processing unit Pn executes that same SIMD instruction 512 in parallel e.g. by processing data held in one or more of its respective vector register components Rx.n, and outputting the results to another of its respective vector register component(s) Rx.n. Thus, each processing unit executed the same SIMD instruction but on separate data to generate separate outputs.

The coprocessor 109 also comprises a control register RC, to which each processing unit Pn is connected. The control register RC comprises a saturation bit QC, the function of which will be described below.

The processing units Pn may have access to other parts of the vector registers, though this is not necessary to implement the algorithm taught below.

In this example, the coprocessor 109 has an ARM NEON architecture, which architecture is known in the art. The control register is called the FPSCR (Floating-Point Status and Control Register) in this architecture.

Figure 6:
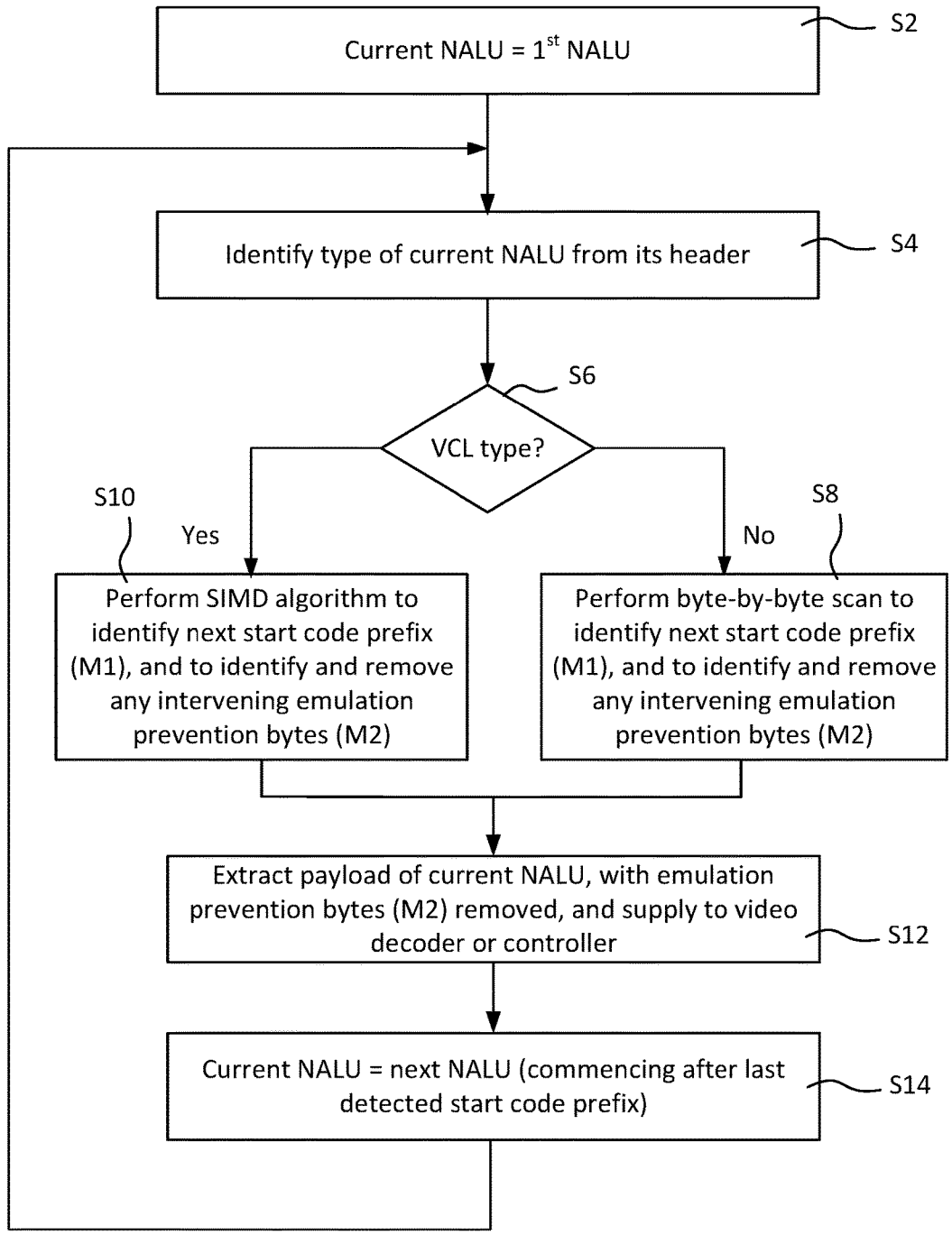
FIG. 6 shows a flow chart for a video decoding method.

FIG. 6 is a flow chart for a video decoding method, in which the new algorithm of the present disclosure is selectively implemented (at step S10). The method is for separating the video content from the remaining bytes in the byte steam 206, including start code prefixed, header data, emulation prevention bytes and control data (e.g. parameter sets/supplemental information).

The method is iterated on a per-NALU basis, with a current NALU subject to the method at each iteration.

The method is implemented by the content separator 402 of FIG. 4. Steps S2-S6 and S8-S14 are implemented by straight line code (e.g. C code, or more precisely straight line machine code compiled from C code) running on the main processor 108, whereas step S10 is implemented by a combination of the main processor 108 and the coprocessor 106.

According to H.264 or HEVC video coding standard, non-VCL NALUs i.e. sequence parameter set NALU, picture parameter set NALU, access unit delimiter NALU, supplemental enhancement information message NALU etc. have short lengths, i.e. in the range of several bytes to less than hundred bytes, most of the time (with very high probability). As a result, the occurrence probability of emulation prevention byte pattern and the start code_prefix_ one_3 bytes byte pattern is high in those NALUs.

In contrast, VCL NALUs, i.e. IDR NALUs, non-IDR NALUs etc., have long lengths most of the time, and as a result the occurrence probability of emulation prevention byte pattern and the start_code_prefix_one_3 bytes byte pattern is low in those NALUs.

There is some overhead needed to implement the new algorithm of optimized byte pattern scan in video data when the occurrence probability of emulation prevention byte pattern and start_code_prefix_one_3 bytes byte pattern etc. is high. This is because the stream is re-parsed with C code when a 0x 00 00 is detected (see below). For this reason, the type of each NALU is detected and the new algorithm only applied where the occurrence probability of emulation prevention byte pattern and start_code_prefix_one_3 bytes byte pattern is low, such as coded slice of non-IDR picture and coded slice of an IDR picture; the new algorithm is not applied on other NALUs to avoid the overhead.

A first iteration of the method commences with the first NALU in the byte stream 206 as the current NALU (S2), which is readily identifiable as it is at the start of the receive byte stream 206. At S4, the type of the current is identified from its header, the header being the first two bytes of the current NALU. At S6 the method branches: if the current NALU is a non-VCL NALU (i.e. which does not contain an encoded slice), then a conventional byte-by-byte scan is performed on the stream 206 to identify the next start code prefix M1 in the stream 206, which marks the end of the current and the start of the next NALU. Any intervening emulation bytes M2 identified along the way are removed. For example, each two-byte subsequence (pair of bytes) in the sequence may be processed in turn (i.e. bytes 0,1 then 1,2 then 2,3 then 3,4 etc.) in a series of linear marker identification operations (linear marker identifications); if the pair matches the known pattern P i.e. 0x 00 00 then the next byte is checked; if the next byte is 0x 03, then it and the preceding occurrence of P are identified as an emulation prevention byte and removed; if the next byte is 0x 01, then it is identified as the next start code prefix M1 and the method proceeds to step S12; if the next byte is anything other than 0x 01 or 0x 03, it is ignored and the scan continues unabated.

Returning to step S6, if the current NALU is a VCL NALU, the method proceeds to step S10 instead. The outcome of S10 is the same as step S8 in that step S10 identifies the next start code prefix in the stream 206 (at which point the method proceeds to step S12), and removes any intervening emulation prevention bytes M2 identified along the way. However, in contrast to step S8, at step S10 the parallel processing capability of the coprocessor 109 is exploited in accordance with the new algorithm to increase the efficiency of the start code prefix M1 and emulation prevention byte M2 identification (i.e. so that the same result is achieved but in less time that would be the case if the NALU in question were subject to a byte-by-byte scan as in S8 instead). Details of step S10 are described below with reference to FIG. 6A.

In identifying the next start code prefix, either at step S8 or S10, the end of the current NALU and thus the extent of the current NALU's payload in the stream 206 is identified. At step S12, the payload of the current NALU is separated from the header and any previously detected start code prefix, and supplied to the decoder via the first output of the content separator 402 if it is an encoded slice, or to the controller 416 via the second output of the content separator 402 otherwise.

In identifying the next start code prefix at S8/S10, the start of the next NALU is identified. Thus, at step S14 the next NALU is set as the current NALU; the method returns to step S4 at which the next iteration commences with the new current NALU.

Figure 6A:
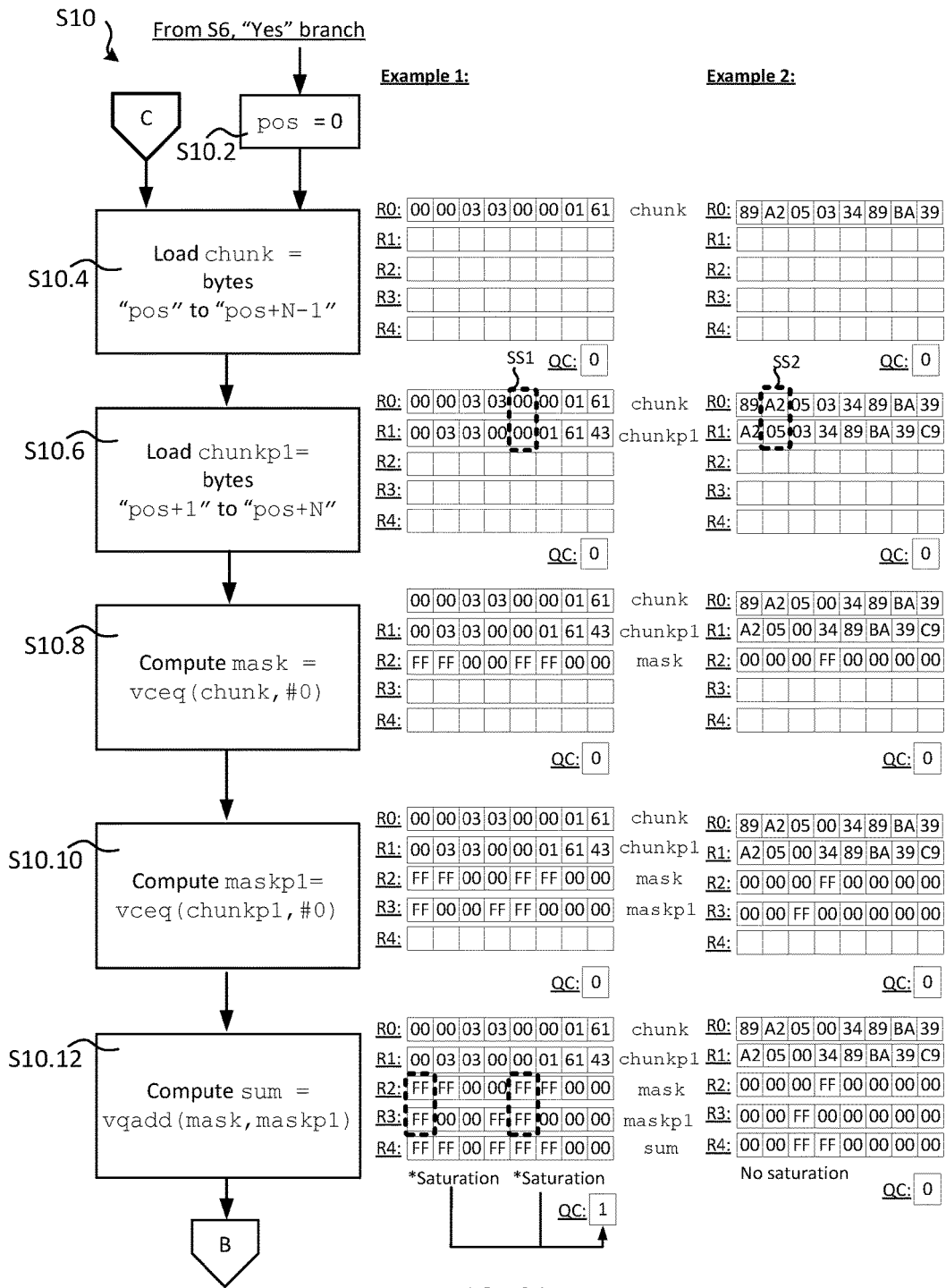
FIG. 6A shows a flow chart for a SIMD marker identification algorithm.
Figure 6A:
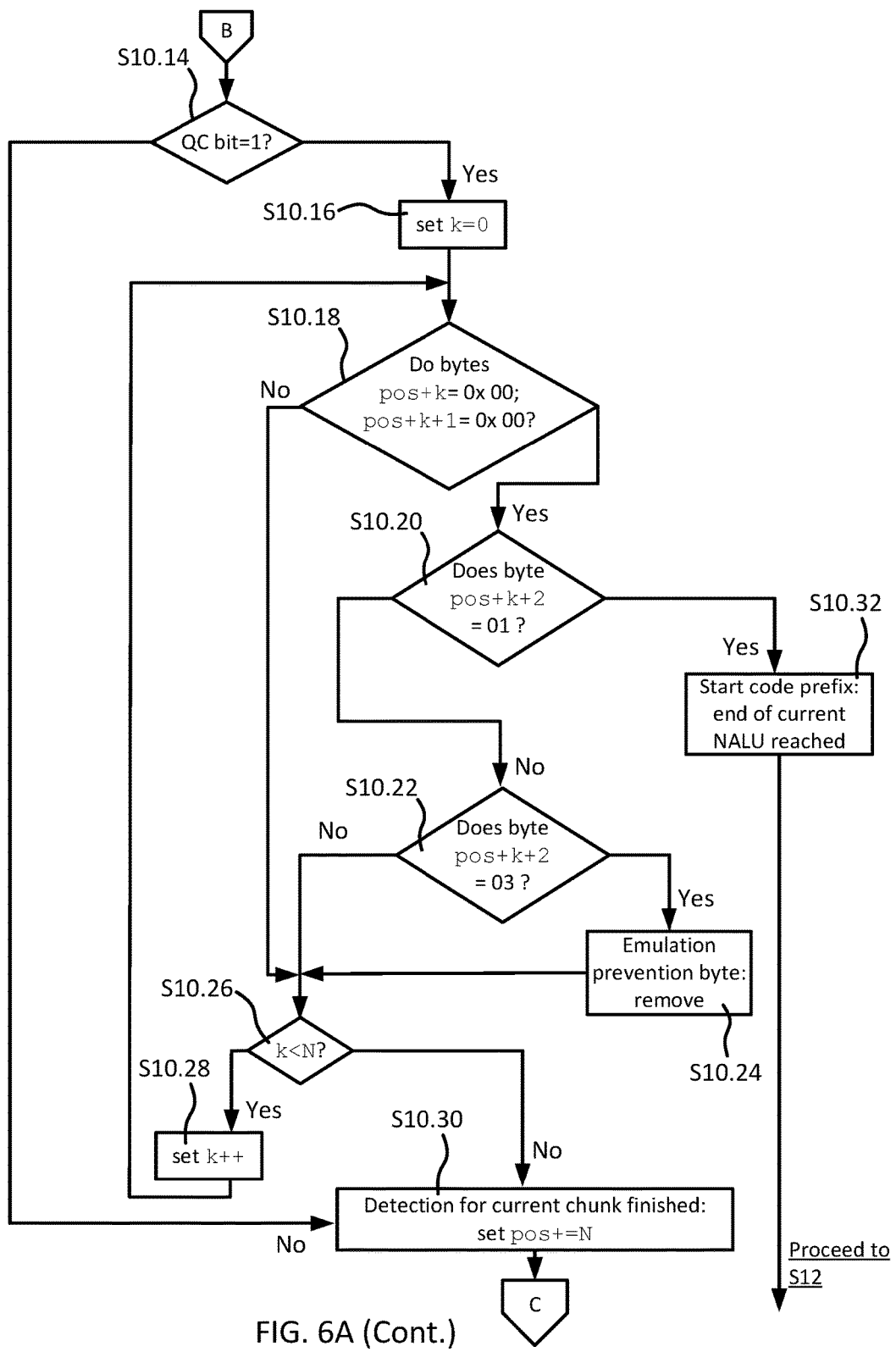

FIG. 6A is a flow chart for the new algorithm of the present disclosure, implemented at step S10 of FIG. 6. The algorithm has been optimized for the ARM NEON architecture, but as will be appreciated the underlying principles can be applied across a wide variety of parallel (e.g. SIMD) processor architectures.

Source code for a part of the algorithm of FIG. 6A is provided below.

The algorithm checks whether the byte pattern (0x00 00) is present with ARM NEON SIMD instructions, N bytes at a time, where N could be equal to 8, 16 or 32 in this ARM NEON example.

If the byte pattern 0x00 00 (i.e. the known pattern P) is present, a C code byte-by-byte (linear) search is used to check whether an emulation prevention byte pattern (0x00 00 03) is present, a start_codeprefix_one_3 bytes byte pattern (0x00 00 01) is present, or neither.

Below and in FIG. 6A, "pos" is an integer, and "byte pos" means the byte at position "pos" in the stream 206; "byte pos+1" means the byte at position "pos+1" in the stream etc.

Steps S10.4-S10.12 of FIG. 6A are implemented by the SIMD coprocessor 109. To aid understanding, to the right of these steps, illustrative values that might be loaded into vector registers R0, . . . , R4 of the coprocessor at each of these steps are shown—these are purely exemplary. For compactness, register values are represented in hexadecimal; in practice they are more likely to be represented in binary in the physical processor hardware. The registers R0, . . . , R4 may or may not be different physical registers i.e. physical registers may or may not be reused at each iteration of step S10, depending on the configuration of the coprocessor 109.

At step S10.2, the method commences at the start of the stream 206 i.e. with pos=0, 0 representing the first byte in the current NALU.

At step S10.4, the N-byte section (chunk) of the stream 206 commencing with byte pos is (i.e. bytes pos to pos+N−1 are) loaded into a vector register R0 of the coprocessor 109 by the coprocessor 109 executing a single SIMD load instruction so that each processing unit Pn performs a respective parallel load to load its respective byte of the stream 206, whereby N bytes are loaded in parallel at step S10.4. At step S10.6, the N-byte section (chunkp1) of the stream 206 commencing with byte pos+1 is (i.e. bytes pos+1 to pos+N are) loaded into a vector register R1 of the coprocessor 109 by the coprocessor 109 executing another single SIMD load instruction, whereby N bytes are loaded in parallel at step S10.6 in a similar manner. The section chunkp1 is thus offset from chunkp1 by 1 byte.

Following steps S10.4-S10.6, each individual processing unit Pn of the coprocessor 109 has loaded in its respective lane 50$n$ a respective two-byte subsequence of the stream 209 (in R0.$n$ and R1.$n$ respectively). By way of example, two such subsequences SS1 and SS2 are labelled both to the right of step S10.6 in FIG. 6A and in FIG. 3 for comparison.

At step S10.8, a mask function is applied to chunk. The mask function maps each zero byte 0x 00 in chunk to 0x FF FF (1111 1111 in binary), and each non-zero byte in chunk to 0x 00 00. Thus, the output of the mask function (in R2) as applied to chunk (mask) is an N-byte sequence containing only 0x 00 and/or 0x FF bytes. Step S10.8 is performed by the coprocessor executing a single SIMD vector equal instruction vceq (effected by vceqq_u8 in the source code below) to compare chunk to the zero vector #0 (zeros in the source code below) i.e. with chunk and #0 as inputs. Each processing unit Pn performs a respective byte-wise comparison of the relevant bytes in its own lane 50$n$ (i.e. of R0.$n$ with 0x0000), whereby N byte-wise comparisons are performed in parallel.

At step S10.10, the mask function is applied to chunkp1 to generate an output maskp1 (in R3). The mask function again maps each zero byte 0x 00 in chunkp1 to 0x FF FF, and each non-zero byte in chunkp1 to 0x 00 00. Step S10.10 is also implemented by the SIMD coprocessor 109 executing a single vceq instruction in a similar manner, whereby N byte-wise comparisons are again performed in parallel at step S10.12, a vector sum function is applied to mask and maskp1. The vector sum function is implemented by each processing unit Pn adding its respective byte-component of mask (R2.$n$) to the corresponding byte component of maskp1 (R3.$n$) i.e. the components of mask and maskp1 in each lane 50$n$ are added to generate an output sum (in R4).

The addition is according to a saturation arithmetic, whereby the sum of two bytes is clamped to a maximum value of 0x FF (saturation threshold) i.e.

$$(0x\ ab) +_{sat} (0x\ cd) = \min(ab+cd, 0x\ FF)$$

where $+_{sat}$ and $+$ denote saturation and normal addition respectively.

Again, step S10.12 is performed by the coprocessor 109 executing a single saturation addition SIMD instruction vceq (effected by vqaddq_u8 in the source code below) so that each processing unit Pn performs a respective saturation addition on the mask, maskp1 bytes in its own lane 50n, whereby N byte-wise saturation additions are performed in parallel.

A saturation occurs when any two corresponding bytes in mask, maskp1 are clamped at 0x FF, i.e. when their sum exceeds the saturation threshold, and does not occur otherwise. As can be readily seen in the examples on the right hand side of FIG. 6A, saturation occurs when and only when both bytes in the two-byte subsequence processed by an individual lane 50n are 0x 00, and thus only occurs when the known byte pattern 0x 00 00 occurs at least once somewhere in the section pos to pos+N of the byte stream 206.

The coprocessor is configured, responsive to a saturation occurring, to set the saturation bit QC of the control register RC to 1 (otherwise it remains at 0). Thus, following completion of step S10.12, the QC bit having a value 1 (resp. 0) indicates that the known byte pattern 0x 00 00 does (resp. does not) occur somewhere in bytes pos to pos+N of the stream 206.

Steps S10.4 to S10.12 constitute a parallel marker identification operation (parallel marker identification), a sequence of which are performed as the method proceeds over time. In this example, in each parallel operation, these steps are implemented by executing a total of just five SIMD instructions.

At step S10.14, the method branches in dependence on the QC bit: if QC=1, which means there is at least one occurrence of the known pattern 0x 00 00 in bytes pos to pos+N, the method proceeds to step S10.16.

Steps S10.16 to S10.28 constitute a linear scan of the section pos to pos+N of the stream 206, and are implemented by straight line code running on the main processor 108. An integer k tracks the current position in the section pos to pos+N. At step S10.16, k is set to zero so as to commence the process at the start of the section pos to pos+N.

At step S10.18, it is determined whether both of the bytes pos+k and pos+k+1 are 0x 00 i.e. whether the kth byte and the k+1th byte in the section pos to pos+N constitute an occurrence of the known pattern P i.e. 0x 00 00. If not, the method proceeds to step S10.26. If so, it is determined whether byte pos+k+2 is 0x 01 (S10.20). If so, that means that the next start code prefix in the stream 206 has been identified (S10.32) and the method proceeds to step S12 (of FIG. 6—see above). If not, it is determined whether byte pos+k+2 is 0x 03 (S10.22). If so, that means the byte pos+k+2 is an emulation prevention byte and it is removed from the stream (S10.24) before proceeding to step S10.26. If not—meaning that byte pos+k+2 is not an emulation prevention byte, and that (pos+k, pos+k+1, pos+k+2) does not constitute a start code prefix—then the method proceeds straight to step S10.26 from step S10.22.

At step S10.26, provided k<N i.e. providing the end of the section pos to pos+N has not been reached, k is incremented by 1 (S10.28) i.e. the method moves to the next byte in the section pos to pos+N, and the method repeats from S20.18 with the new value of k.

Otherwise i.e. once the end of the section pos to pos+N, the method proceeds to step S10.30.

Returning to step S.10.14, if QC=0, which means there is no occurrence of the known pattern 0x 00 00 in bytes pos to pos+N, then the method proceeds straight to S10.30 instead. Step S10 is only instigated if the current NALU contains encoded video content—of course, a small amount of control data from the start of the next NALU may end up being subject to parallel processing as the next start code prefix marking that next packet is identified, and the next NALU may happen to be non-VLC such that a small amount of non-NALU data is subject to parallel processing.

At step S30, pos is incremented by N, and the next parallel marker identification operation (S10.4-S10.12) is performed for the next section of the sequence (i.e. pos+N to pos+2N−1, as it were).

The following is source code for an exemplary implementation of the algorithm of FIG. 6A.

```
chunk = vld1q_u8 ((const unsigned char *) pos);
chunkp1 = vld1q_u8 (((const unsigned char *)pos)+1);
mask = vceqq_u8( chunk, zeros );
maskp1 = vceqq_u8( chunkp1, zeros );
sum = vqaddq_u8( mask, maskp1 ); // sets the FPSCR. QC bit if any pair was both 00.
fpscr = __MoveFromCoprocessor(10, 7, 1, 0, 0 );
if (fpscr & 0x08000000)
{
    // some double 00 within this stretch of 16 bytes
    // re-parse and handle in c
    int k;
    for ( k=0; k<16; k++)
    {
        // the location of 0x00 00
        if ( 0x00 == *(pos + k ) && 0x00 == *(pos + k +1 ) )
        {
            break;
        }
    }
    ......
}
    else
{
    // handle memcpy using NEON intrinsics to write data out.
    vst1q_u8((unsigned char *)(pucNALUBuf+iPos), chunk);
    pos      += 16;
    inputIdx += 16;
    iPos     += 16;
}
```

The ARM NEON processing architecture is just one example of a parallel architecture on which the present subject matter can be implemented.

For instance, a similar algorithm can be implemented on a processor having an x86/amd64 SSE architecture, again known in the art.

The algorithm checks whether the byte pattern 0x00 00 is present with x86/amd64 SSE instructions, N bytes at a time, where N could be equal to 16, 32 or more. If the byte pattern 0x00 00 is present, a check is performed using a C-code byte-by-byte search to determine whether it is a emulation prevention byte pattern, a start_codeprefix_one_3 bytes byte pattern or neither of them.

Dependent on platform capabilities, the performance improvement varies. For example, x86/amd64 SSE has richer set of SIMD instructions compared to ARM NEON. Hence the performance gain on x86/amd64 SSE is more significant than that on ARM NEON. Typically, a 60~80% performance gain (in terms of processing time) is achieved on x86/amd64 with SSE, and a 10~20% gain on ARM NEON.

Note here ARM NEON and x86/amd64 SSE are just two examples. The subject matter can be implemented on many other platforms.

As will be apparent, the algorithm can be readily adapted to include detection of 4 byte start code prefixes 0x 00 00 00 01. The algorithm of FIG. 6A is not limited to patterns of the form 0x 00 00. For example the pattern need not be of the form 0x 00 00—the above algorithm the algorithm of FIG. 6A could be adapted to patterns of the form 0x cd ef by replacing vceq(chunk,#0) in step S10.8 [S10.10] with vceq (chunk,#cd) where #cd=cd cd cd . . . , and vceq(chunkp1,#0) with vceq(chunkp1,#ef) where #ef=ef ef ef . . . . More generally, the techniques can be applied to identify known patterns of any length (more than two data elements) and any form in a manner that will be apparent.

Note that, in the above, in a byte sequence of the form "0x 00 00 03 03", it is immaterial which of the "0x 03" bits is removed as the result is the same. Thus, either of the 0x 03 bytes can be viewed as the emulation prevention marker, irrespective of which one has actually been inserted by the encoder i.e. the emulation prevention marker is simply whichever one is removed.

Whilst the above is presented with reference to the H.264 and HEVC standards, the subject matter is not limited to this, and can be applied to any type of video stream, standardized or non-standardized, in which markers are indicated by occurrences of a known pattern. The markers may or may not be start code prefixes or emulation prevention markers.

The above has been described in the context of a byte stream, but the subject matter applies to any type of stream of data elements (e.g. bits, nibbles, etc.) some of which encode video content. Further, whilst in the above, a stream is received by a computer from a network, the stream can alternatively be received locally from a computer readable storage medium accessible to the computer e.g. it may be streamed from a file in the local storage. References to "receiving an encoded unit stream" below include such local streaming, whereby the stream is accessed from local storage.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user devices (user terminals) may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

According to a first aspect, a video decoding method, implemented by a computer having multiple parallel processing units, comprises: receiving a stream of data elements, some of which encode video content, the stream comprising marker sequences, each marker sequence comprising a marker which does not encode video content, wherein a known pattern of data elements occurs in each marker sequence; supplying a respective part of the stream to each parallel processing unit; each parallel processing unit processing the respective part of the stream, whereby multiple parts of the stream are processed in parallel, to detect whether any of the multiple parts matches the known pattern of data elements, thereby identifying the markers; separating the encoded video content from the identified markers; decoding the separated video content; and outputting the decoded video content on a display.

In embodiments, at least some of the markers may be dividing markers which divide the stream into packets, the dividing markers identified to identify the packets.

Each packet may comprise payload data and header data, and the method may comprise, when each packet is identified:
  if the header data identifies the payload data as being encoded video content, repeatedly supplying respective parts of the stream to each parallel processing unit until the next packet is identified, and
  if the header data identifies the payload data as being control data, processing the stream one part at a time to identify the next packet.

The method may comprise, if any of the multiple parts matches the known pattern, reprocessing those multiple parts one part at a time to identify which one(s) of the multiple parts matches the known pattern.

At least a first of the markers may be an emulation prevention marker, without which a second part of the stream would constitute an illegal occurrence of a first pattern of data elements, and the first marker may be identified to remove it from the stream before the first section is decoded. For example, the first pattern of data elements may be such that the first part of the stream would otherwise be mistaken for a dividing marker. Alternatively or additionally, at least a second of the markers may be an emulation prevention marker, without which a second part of the stream would itself be mistaken for an emulation prevention marker, and the second marker may be identified to remove the second marker from the stream before the second part is decoded.

The known pattern may be a two data element sequence comprising a data element having a first value followed by a data element having a second value (e.g. 0x 00 00); the step of supplying may comprise:

i) loading a section of the stream in a vector register, ii) loading another section of the stream in another vector register, the other section offset from the section by one data element;

each of the processing units may process in parallel a respective data element in the register and its corresponding data element in the other register to detect whether any data element in the register and its corresponding data element in the other register match the first and second values respectively. For example, the first and second values may both be the minimum value a data element can take (e.g. 0x 00).

The register, the other register, and the processing units may constitute a SIMD processor, and each of steps i) and ii) may be implemented by the SIMD processor executing a single respective SIMD instruction.

The processing by the parallel processing units may comprise:

iii) computing a mask function for the data elements in the register, which maps the first value to a third value (e.g. 0x FF) and any other value to a fourth value (e.g. 0x 00), to generate a mask output;

iv) computing a mask function for the data elements in the other register, which maps the second value to a fifth value (e.g. 0x FF) and any other value to a sixth value (e.g. 0x 00), to generate another mask output; and v) computing a vector sum of the mask output and the other mask output according to a saturation arithmetic;

a saturation m when the third and fifth values are summed but not when the third and sixth values or the fourth and fifth values are summed, and detecting whether any data element in the register and its corresponding data element in the other register match the first and second values respectively may comprise detecting whether a saturation has occurred in step v).

The third and fifth values may both be the maximum value a data element can take (e.g. 0x FF), and the fourth and six values are both the minimum value a data element can take (e.g. 0x 00).

Each of steps iii), iv) and v) may be implemented by the SIMD processor executing a single respective SIMD instruction.

The stream may be received from a network. For example, the stream may be received in a video communication event between a user and another user.

The data elements may be bytes.

Each part may comprise two data elements of the stream, the known pattern being two data elements in length.

The stream may formatted according to the H.264, HEVC or any standard using a Network Abstraction Layer unit structure.

According to a second aspect, a computer program product comprises code stored on a computer readable storage medium and configured, when run on a computer having multiple parallel processing units, to implement a video decoding method according to the first aspect or any embodiment described herein, such as a video decoding method comprising: receiving a stream of data elements, some of which encode video content, the stream comprising marker sequences, each marker sequence comprising a marker which does not encode video content, wherein a known pattern of data elements occurs in each marker sequence; supplying a respective part of the stream to each parallel processing unit; each parallel processing unit processing the respective part of the stream, whereby multiple parts of the stream are processed in parallel, to detect whether any of the multiple parts matches the known pattern of data elements, thereby identifying the markers; separating the encoded video content from the identified markers; decoding the separated video content; and outputting the decoded video content on a display.

According to a third aspect, a computer has multiple parallel processing units and comprises: a display; an input configured to receive a stream of data elements, some of which encode video content, the stream comprising marker sequences, each marker sequence comprising a marker which does not encode video content, wherein a known pattern of data elements occurs in each marker sequence; a content separator configured to supply a respective part of the stream to each parallel processing unit, each parallel processing unit configured to process the respective part of the stream, whereby multiple parts of the stream are processed in parallel, to detect whether any of the multiple parts matches the known pattern of data elements, thereby identifying the markers, the content separator configured to separate the encoded video content from the identified markers; and a video decoder configured to decode the separated video content and output the decoded video content on the display.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method comprising:
    determining a type of a data packet in a data stream that includes data packets and marker sequences;
    detecting in the data packet one or more occurrences of a known pattern of data elements by, responsive to the type of the data packet indicating that the data packet includes encoded video content, processing in parallel different parts of the data packet with different respective parallel processing units by, for each parallel processing unit:
    forming a plurality of subsequences from a respective part of the data packet, each element of the plurality of subsequences being a first value or a second value;
    summing, for each subsequence, elements of said each subsequence to form a plurality of sums; and
    indicating the one or more occurrences when the plurality of sums indicate one or more saturations, wherein a saturation is identified when a sum exceeds a saturation threshold; and
    removing emulation prevention markers following at least some of the one or more occurrences of the known pattern of data elements in the data packet to generate a decodable version of the data packet;
    decoding the encoded video content; and
    outputting the decoded video content for display.

2. The method according to claim 1 wherein the data stream includes real-time video communication.

3. The method according to claim 2 wherein the real-time video communication includes at least one of a video call, screen sharing, or whiteboard session.

4. The method according to claim 1 further comprising:
    identifying dividing markers from the marker sequences;
    separating the data packets including encoded video content from the dividing markers;
    wherein the encoded video content of the data packets is decoded from the separated data packets.

5. The method according to claim 1 further comprising determining a start of the data packet by detecting a presence of a first marker sequence in the data stream.

6. The method according to claim 1 wherein a probability of occurrence of the known pattern of data elements in the data packet is less than the probability of occurrence of the known pattern of data elements in a different data packet that does not include encoded video content.

7. The method according to claim 1 wherein the first value is selected to cause a saturation when summed with itself a number of times corresponding to a number of data elements in the known pattern and the second value is selected to prevent a saturation when the second value is included in the summing.

8. The method according to claim 1 wherein the plurality of subsequences are formed by mapping each zero-valued element of the respective part of the data packet to the first value and each non-zero-valued element of the respective part of the data packet to the second value.

9. The method according to claim 1 wherein each parallel processing unit processes the respective part of the data packet in parallel by executing a same instruction on different data sets.

10. A system comprising:
at least one processor; and
one or more computer-readable storage media including instructions stored thereon that, responsive to execution by the at least one processor, cause the system to perform operations including:
determining a type of a data packet in a data stream that includes data packets and marker sequences;
detecting in the data packet one or more occurrences of a known pattern of data elements by, responsive to the type of the data packet indicating that the data packet includes encoded video content, processing in parallel different parts of the data packet with different respective parallel processing units by, for each parallel processing unit:
forming a plurality of subsequences from a respective part of the data packet, each element of the plurality of subsequences being a first value or a second value;
summing, for each subsequence, elements of said each subsequence to form a plurality of sums; and
indicating the one or more occurrences when the plurality of sums indicate one or more saturations, wherein a saturation is identified when a sum exceeds a saturation threshold; and
removing emulation prevention markers following at least some of the one or more occurrences of the known pattern of data elements in the data packet to generate a decodable version of the data packet;
decoding the encoded video content; and
outputting the decoded video content for display.

11. The system according to claim 10 wherein the data stream includes real-time video communication.

12. The system according to claim 10 wherein a probability of occurrence of the known pattern of data elements in the data packet is less than the probability of occurrence of the known pattern of data elements in a different data packet that does not include encoded video content.

13. The system according to claim 10 wherein the first value is selected to cause a saturation when summed with itself a number of times corresponding to a number of data elements in the known pattern and the second value is selected to prevent a saturation when the second value is included in the summing.

14. The system according to claim 10 wherein the plurality of subsequences are formed by mapping each zero-valued element of the respective part of the data packet to the first value and each non-zero-valued element of the respective part of the data packet to the second value.

15. A video decoding device comprising:
an input configured to receive a data stream, the data stream including data packets and marker sequences;
a plurality of parallel processing units; and
a content separator module implemented at least partly in hardware of the video decoding device to:
determine a type of a data packet in a data stream that includes data packets and marker sequences;
detect in the data packet one or more occurrences of a known pattern of data elements by, responsive to the type of the data packet indicating that the data packet includes encoded video content, processing in parallel different parts of the data packet with different respective parallel processing units by, for each parallel processing unit:
forming a plurality of subsequences from a respective part of the data packet, each element of the plurality of subsequences being a first value or a second value;
summing, for each subsequence, elements of said each subsequence to form a plurality of sums; and
indicating the one or more occurrences when the plurality of sums indicate one or more saturations, wherein a saturation is identified when a sum exceeds a saturation threshold; and
remove emulation prevention markers following at least some of the one or more occurrences of the known pattern of data elements in the data packet to generate a decodable version of the data packet;
decode the encoded video content; and
output the decoded video content for display.

16. The video decoding device according to claim 15 wherein the data stream includes real-time video communication.

17. The video decoding device according to claim 15 wherein a probability of occurrence of the known pattern of data elements in the data packet is less than the probability of occurrence of the known pattern of data elements in a different data packet that does not include encoded video content.

18. The video decoding device according to claim 15 wherein the first value is selected to cause a saturation when summed with itself a number of times corresponding to a number of data elements in the known pattern and the second value is selected to prevent a saturation when the second value is included in the summing.

19. The video decoding device according to claim 15 wherein the plurality of subsequences are formed by mapping each zero-valued element of the respective part of the data packet to the first value and each non-zero-valued element of the respective part of the data packet to the second value.

20. The video decoding device according to claim 15 wherein the emulation prevention markers are not removed following others of the one or more occurrences of the known pattern of data elements in the data packet.

* * * * *